(12) United States Patent
Cvek

(10) Patent No.: US 6,996,895 B2
(45) Date of Patent: Feb. 14, 2006

(54) ELASTOMERIC MATERIAL APPLICATION SYSTEM

(76) Inventor: Sava Cvek, 40 Woodland Rd., Jamaica Plain, MA (US) 02130

( * ) Notice: Subject to any disclaimer, the term of this patent is extended or adjusted under 35 U.S.C. 154(b) by 38 days.

(21) Appl. No.: 10/868,736

(22) Filed: Jun. 14, 2004

(65) Prior Publication Data

US 2005/0044678 A1    Mar. 3, 2005

Related U.S. Application Data

(60) Provisional application No. 60/478,024, filed on Jun. 11, 2003.

(51) Int. Cl.
*B23P 19/00* (2006.01)

(52) U.S. Cl. ............... 29/700; 29/281.1; 29/281.4; 29/91.5; 29/448; 29/452; 29/464; 29/559; 297/218.5

(58) Field of Classification Search ........... 29/91, 29/91.5, 452, 448, 464, 465, 559, 700, 791, 29/795, 281.1, 281.4; 297/218.3, 218.5, 297/452.13
See application file for complete search history.

(56) References Cited

U.S. PATENT DOCUMENTS

| | | | | |
|---|---|---|---|---|
| 3,315,301 A | * | 4/1967 | Dibblee et al. | 26/1 |
| 5,345,661 A | * | 9/1994 | Hotton et al. | 29/91.1 |
| 5,457,864 A | * | 10/1995 | Sakaida | 29/91.5 |
| 6,065,197 A | * | 5/2000 | Iseki et al. | 29/91.1 |
| 6,167,603 B1 | * | 1/2001 | Zeiler et al. | 29/281.1 |
| 6,199,251 B1 | * | 3/2001 | Zeiler | 29/33 R |

* cited by examiner

Primary Examiner—David P. Bryant
Assistant Examiner—Jermie E. Cozart
(74) Attorney, Agent, or Firm—O'Connell Law Firm

(57) ABSTRACT

A material application system for applying a panel of material to a framework with a shoe for retaining the framework, a nest, opposed mechanisms for retaining opposite portions of the panel of material traversing between the shoe and the nest, an arrangement for selectively moving the shoe and the nest into and out of an engaged position wherein the panel of material is sandwiched between the shoe and the nest and a disengaged position, and an arrangement for inducing an attachment of the panel of material to the framework. The opposed mechanisms can be clamping mechanisms, which can be segmented and individually moveable to enable variable pretensioning. A contoured deflection control member can alternatively produce variable pretensioning. A pressing arrangement with a tooth member can press a locking spline into a groove in the framework to secure the material.

32 Claims, 15 Drawing Sheets

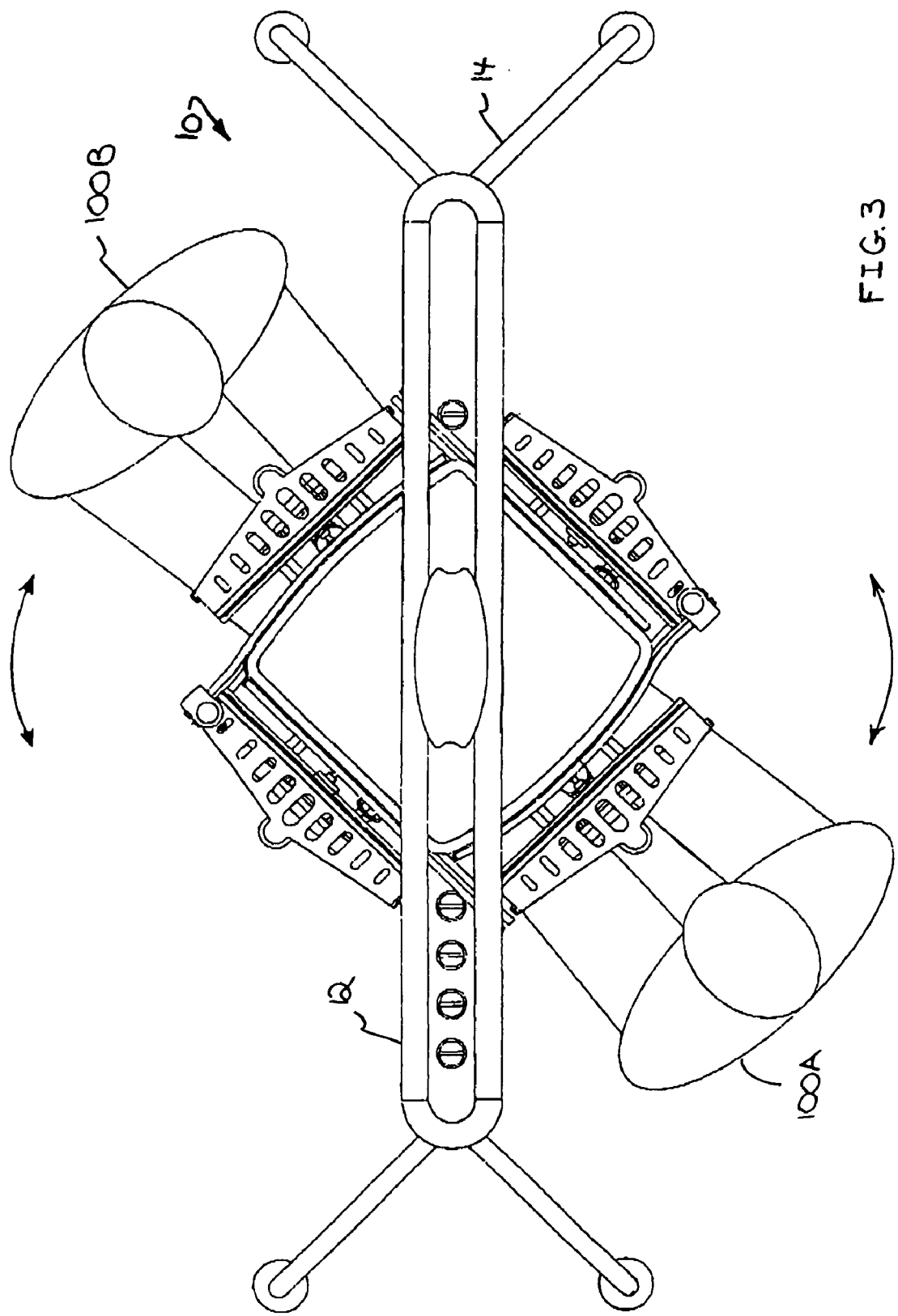

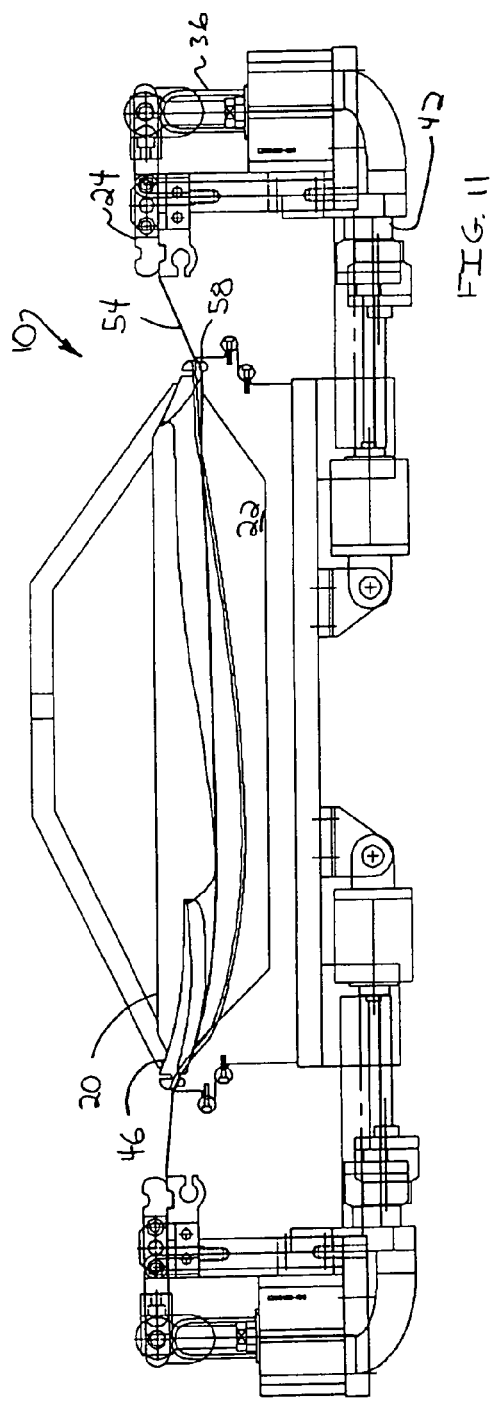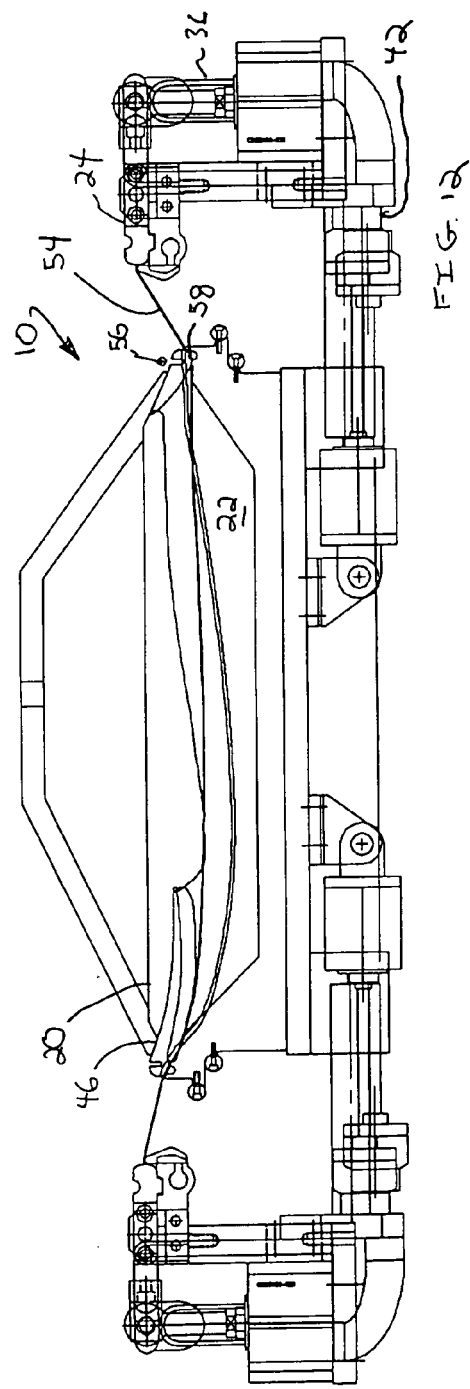

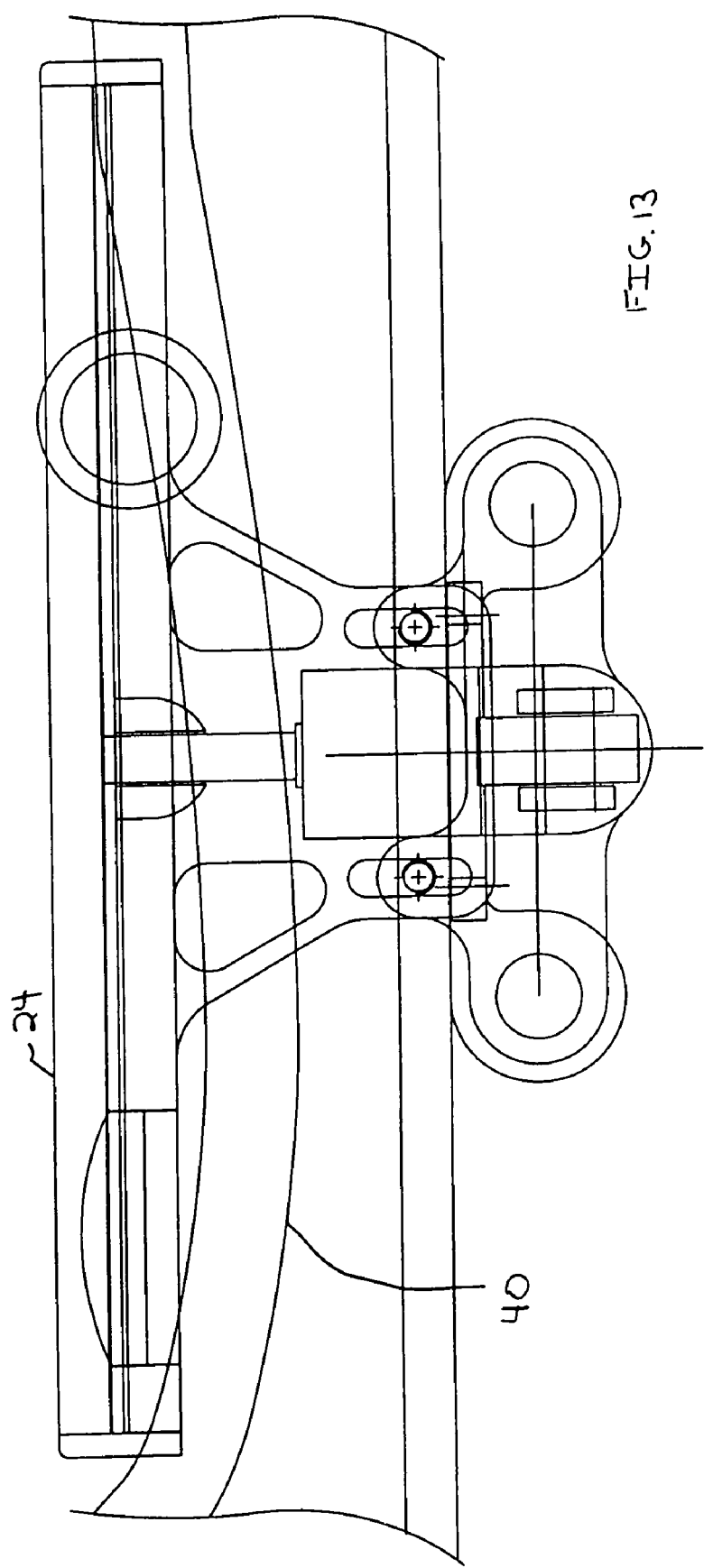

ELASTOMERIC MATERIAL APPLICATION SYSTEM

FIELD OF THE INVENTION

The present invention relates generally to fabric application systems and methods. More particularly, disclosed and protected herein are systems and methods for the application of elastomeric materials.

BACKGROUND OF THE INVENTION

In traditional upholstered furniture construction, a layer of fabric, commonly referred to as any "A" layer, is retained relative to a frame structure overlying one or more subsurface layers, commonly referred to as "B", "C", and possibly further layers. The subsurface layers, which can comprise additional fabric layers, foam layers, springs, bands, and the like, generally provide continuous support to the "A" layer. As such, the "A" layer itself need only be attached to the frame structure; it need not provide substantial support. With this, attachment methods for "A" layers in such structures commonly involve simple stapling, adhering, or the like.

More recently, furniture constructions have been developed wherein one or more panels of fabric span a framework with no central support. Commonly, the fabric comprises an elastomeric material, such as an elastomeric mesh material. Since the fabric panel acts as the sole means of support to furniture occupants and the like, the peripheral edges of the fabric panel must be attached particularly securely.

Attempting that that secure attachment presents unique challenges to the furniture maker. This is particularly the case relative to elastomeric materials and especially so relative to elastomeric mesh materials. For example, for optimal appearance and performance, elastomeric materials normally must be pretensioned and secured in place while maintaining that pretensioning.

Additionally, since elastomeric material, particularly elastomeric mesh, is formed by numerous individual elastomeric filaments, continuous support must be provided over substantially the entire periphery of the fabric panel to ensure that each elastomeric filament is fixedly retained. Even further still, it can be desirable to provide different support characteristics relative to different areas of the panel of elastomeric material, which may demand a variable pattern of pretensioning, thereby further complicating the attachment process.

Prior art methods and structures have struggled in seeking to confront the aforementioned and further challenges of applying a fabric panel to a framework. Many attachment methods and systems have proven to be undesirably inefficient. Other methods and arrangements have failed to provide adequate retention of the fabric panel. Still further, particularly since the fabric panel acts as the sole means of support to furniture occupants and the like, it has been found that many prior art attachment arrangements have left the fabric panel and the edges thereof disadvantageously vulnerable to dislodging, damage, and tampering. Also, many prior art structures and methods are unable to adapt to varied framework structures.

These and further disadvantages have heretofore prevented elastomeric material application methods and arrangements from achieving widespread use and commercial success. As a result, it is clear that there remains a discernable need for systems and methods for the application of elastomeric materials that meets the needs and overcomes the disadvantages that have been left by the prior art.

SUMMARY OF THE INVENTION

Advantageously, the present invention is founded on a basic object of overcoming the disadvantages suffered by the prior art while providing a number of previously unrealized advantages thereover.

A more particular object of embodiments of the invention is to provide systems and methods for applying material to a framework in an efficient and effective manner.

Another object of the invention is to provide systems and methods for applying material to a framework to be retained securely thereby.

A related object of embodiments of the invention is to provide systems and methods for applying material to a framework to enable substantially continuous support over at least a portion of a periphery of a fabric panel to provide a reliable retention of individual fibers forming the fabric panel.

Another object of particular embodiments of the invention is to provide systems and methods for applying material to a framework that enables a selective pretensioning of the fabric, including with a variable pretensioning pattern.

These and in all likelihood further objects and advantages of the present invention will become obvious not only to one who reviews the present specification and drawings but also to those who experience an embodiment of the systems and methods for applying material to a framework disclosed herein. However, it will be appreciated that, although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In carrying forth these objects, one embodiment of the present invention for a material application system for applying a panel of material to a framework includes a shoe for retaining a framework to which the panel of material is to be applied, a means for retaining the framework relative to the shoe, a nest, a means for retaining the panel of material traversing between the shoe and the nest, a means for selectively moving the shoe and the nest into and out of an engaged position wherein the panel of material is sandwiched between the shoe and the nest and a disengaged position, and a means for inducing an attachment of the panel of material to the framework.

The means for retaining the panel of material between the shoe and the nest can take the 4 form of opposed mechanisms for retaining opposite portions of the panel of material. Means can be provided for selectively moving at least one of the opposed mechanisms proximally and distally relative to the other whereby a pretensioning of the panel of material can be induced. In certain embodiments, there can be longidutinally opposed mechanisms and laterally opposed mechanisms. While many types of opposed retaining mechanisms would readily occur to one skilled in the art, the opposed mechanisms can comprise clamping members.

In certain embodiments, the material application system can additionally incorporate a means for inducing a varied pretensioning of the panel of material. That means could vary widely within the scope of the invention. In one embodiment, the means could be achieved by a segmenting of at least one of the opposed mechanisms for retaining opposite portions of the panel of material. For example, where the opposed mechanisms comprise clamping arrangemens, at least one of the clamping arrangements can be segmented into multiple, individually moveable clamping arrangements.

Alternatively, the means for inducing a varied pretensioning of the panel of material can take the form of a deflection control member in combination with a means for retaining the deflection control member with at least a portion thereof interposed between the opposed mechanisms for retaining opposite portions of the panel of material and the shoe and the nest. The deflection control member can have a surface that varies in effective height to yield a varied pretensioning in the panel of material when the shoe and the nest are in an engaged position.

The framework can have a groove therein and a locking spline can be received into the groove with a portion of the panel of material disposed therebetween thereby to secure the panel of material relative to the framework. In such a case, the means for inducing an attachment of the panel of material to the frame member can comprise a means for pressing the locking spline into the groove. That means could in one embodiment comprise a pressing arrangement with a tooth member and a means for reciprocatably driving the tooth member. There can additionally be a means, such as a rail contoured to match a contour of the framework, for enabling the tooth member to travel along an edge of the framework to enable a progressive pressing of the locking spline into the groove.

The framework and the shoe can each be considered to have a peripheral edge. The peripheral edges of the framework can project beyond the peripheral edges of the shoe relative to the nest. With this, the peripheral edges of the framework will tend to make first contact with the nest when the shoe and the nest are in an engaged position such that a mutual frictional engagement will be achieved between the framework, the panel of material, and the nest. To facilitate that frictional engagement, the nest can have an engaging surface sized, shaped, and contoured to correspond to the size, shape, and contour of a peripheral surface of the frame member. An O-ring can be disposed along the engaging surface.

One will appreciate that the foregoing discussion broadly outlines the more important features of the invention to enable a better understanding of the detailed description that follows and to instill a better appreciation of the inventor's contribution to the art. Before any particular embodiment or aspect thereof is explained in detail, it must be made clear that the following details of construction, descriptions of hardware and software designs, and illustrations of inventive concepts are mere examples of the many possible manifestations of the invention.

BRIEF DESCRIPTION OF THE DRAWINGS

In the accompanying drawing figures:

FIG. 3 is a top plan view of the elastomeric material application system of FIG. 1;

FIG. 7A is a view in front elevation of a deflection control member according to the present invention;

FIG. 11 is a view in front elevation of the elastomeric material application system of FIG. 8 in a fourth stage of material application;

FIG. 12 is a view in front elevation of the elastomeric material application system of FIG. 8 in a fifth stage of material application;

FIG. 13 is a view in side elevation of an elastomeric material application system pursuant to the present invention;

DETAILED DESCRIPTION OF PREFERRED EMBODIMENTS

The elastomeric material application systems and methods disclosed herein are subject to a wide variety of embodiments. However, to ensure that one skilled in the art will be able to understand and, in appropriate cases, practice the present invention, certain preferred embodiments of the broader invention revealed herein are described below and shown in the accompanying drawing figures. Before any particular embodiment of the invention is explained in detail, it must be made clear that the following details of construction, descriptions of geometry, and illustrations of inventive concepts are mere examples of the many possible manifestations of the invention.

Figure 1:
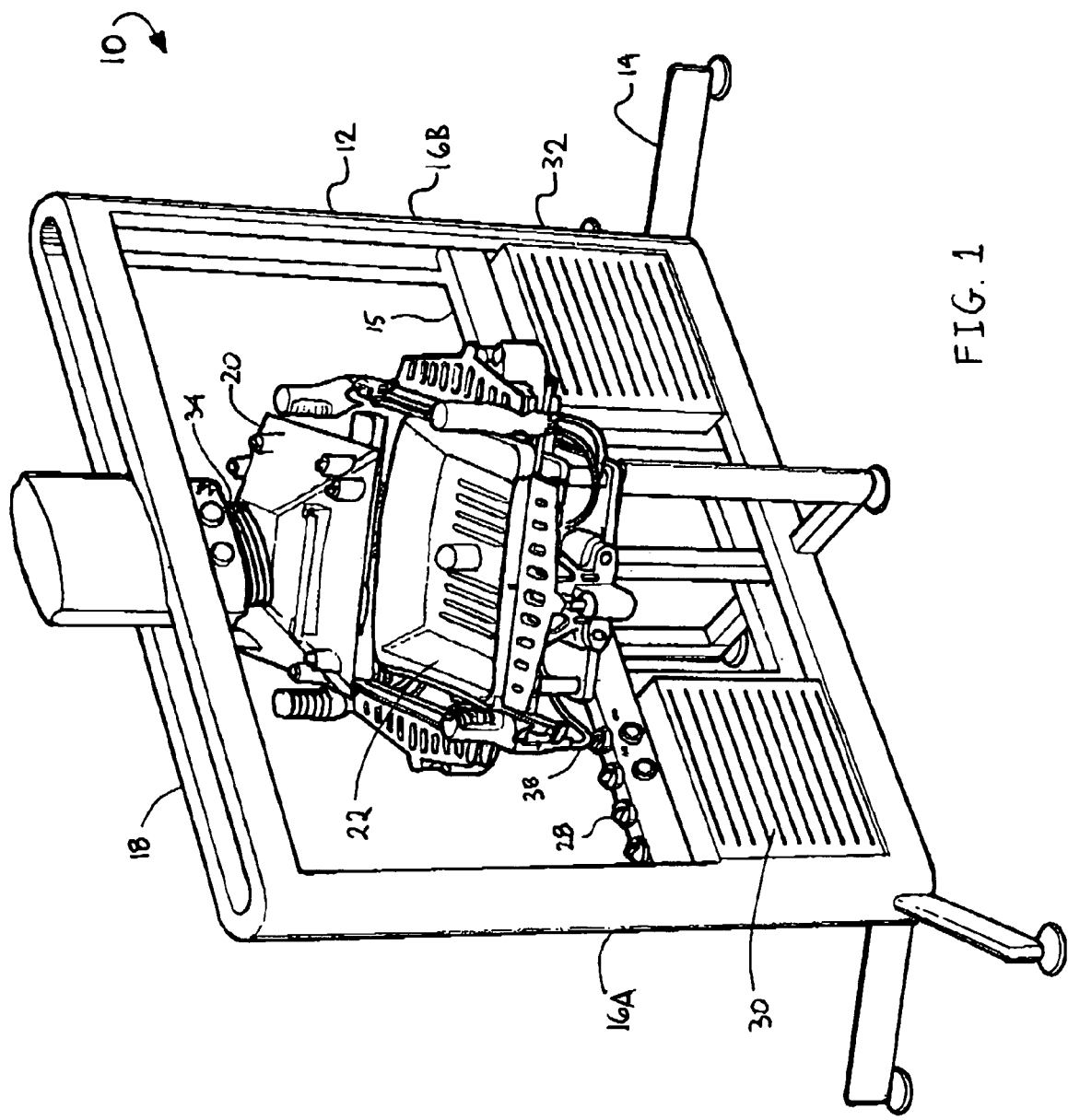
FIG. 1 is a perspective view of an elastomeric material application system according to the present invention.
Figure 2:
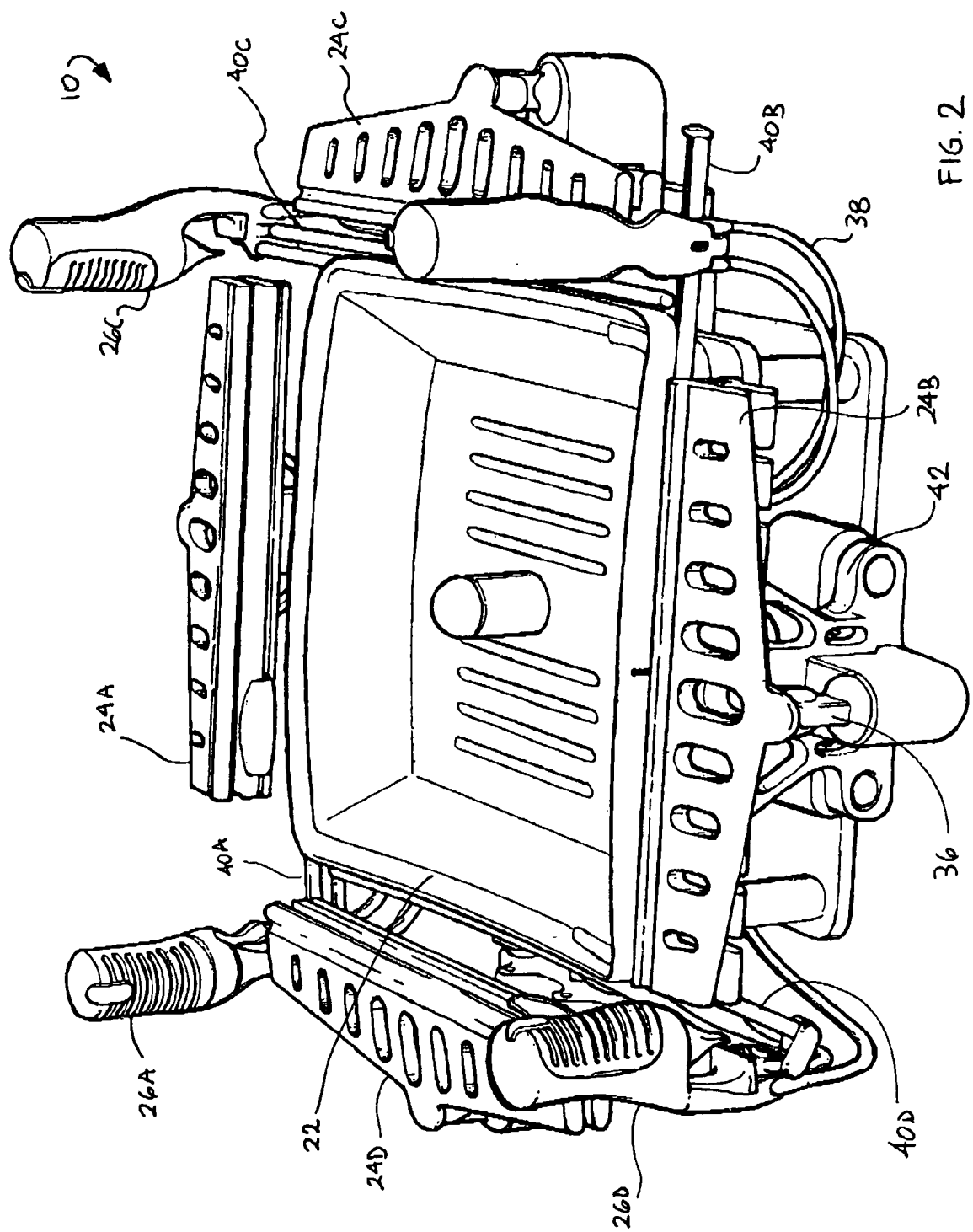
FIG. 2 is a perspective view of a nest and clamping portions of the elastomeric material application system of FIG. 1.
Figure 5:
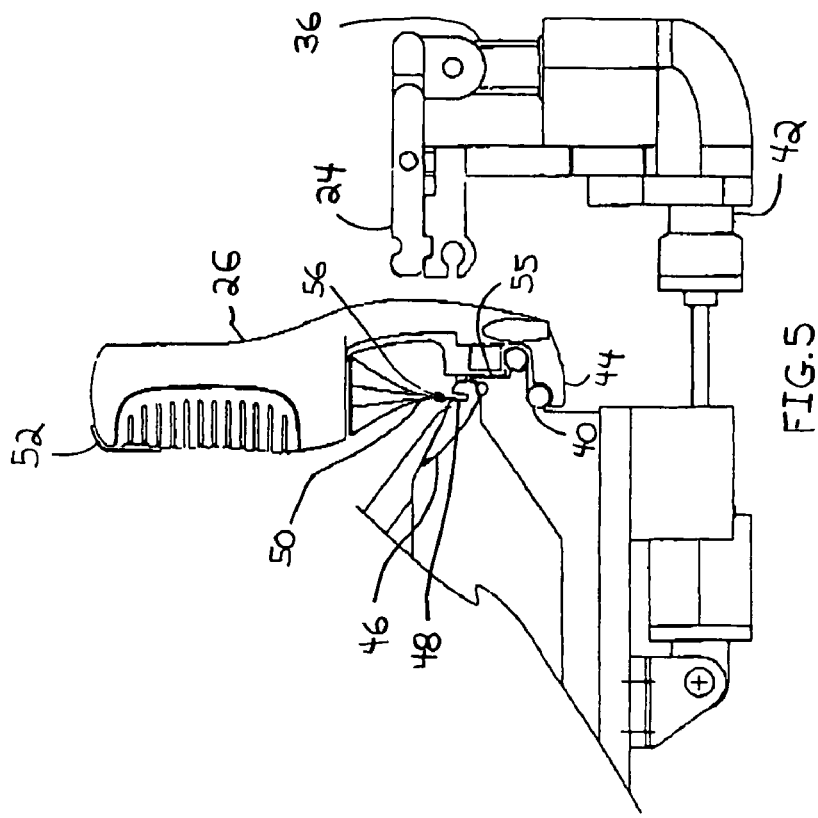
FIG. 5 is a view in front elevation of the pressing and clamping arrangements of FIG. 4.
Figure 4:
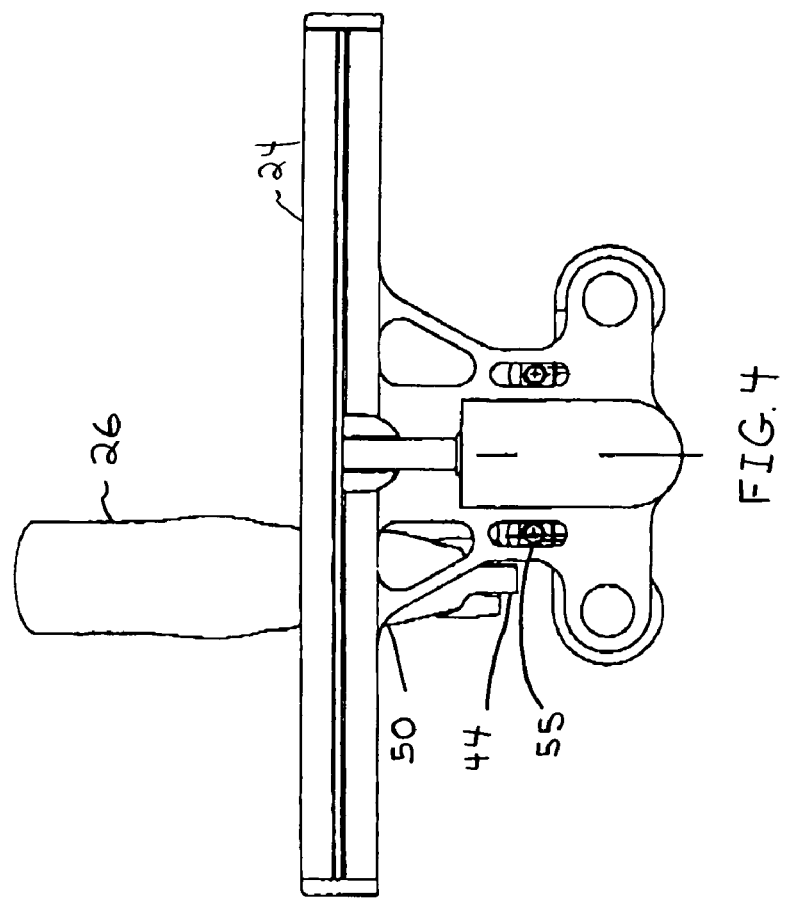
FIG. 4 is a view in rear elevation of pressing and clamping arrangements pursuant to the present invention.
Figure 6:
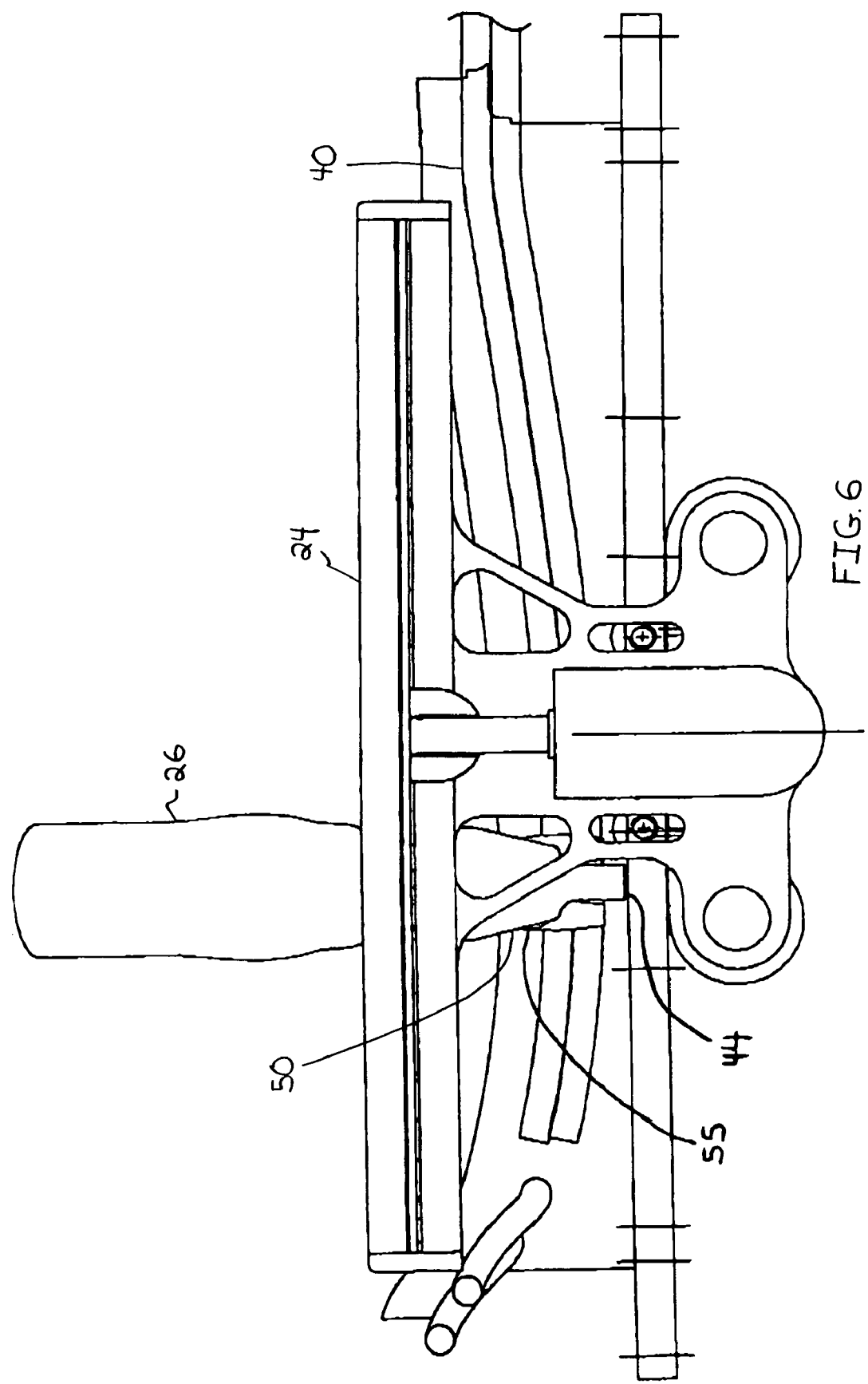
FIG. 6 is a view in rear elevation of pressing and clamping arrangements according to the present invention in combination with a rail for enabling a traveling of a hook member of the pressing arrangement.

Looking more particularly to the drawings, an embodiment of an elastomeric material application system according to the present invention is indicated generally at 10 in FIGS. 1 through 3. The elastomeric material application system 10 has a rectangular frame 12 that is supported by a plurality of legs 14. The frame 12 has first and second support posts 16A and 16B that retain a header 18. A shoe 20 is reciprocatably retained relative to the header 18 by a reciprocating means 34, which in this case comprises a piston arrangement 34. A nest 22 is supported by a cross member 15.

In this exemplary embodiment, the shoe 20 and the nest 22 are generally rectangular. The shoe 20 and the nest 22 are identically oriented relative to one another and are catercorner relative to the plane of the rectangular frame 12. With that, first and second adjacent sides of the shoe 20 and the nest 22 are disposed to a first side of the rectangular frame 12 and second and third adjacent sides of the shoe 20 and the nest 22 are disposed to a second side of the rectangular frame 12. A plurality of control knobs 28 are disposed along the cross member 15. A control box 30, which houses system circuitry and certain control mechanisms, is disposed below the cross member 15 to a first side of the shoe 20 and nest 22. A hydraulics box 30, which houses system hydraulics and certain control mechanisms, is disposed below the cross member 15 to a second side of the shoe 20 and nest 22.

Turning more particularly to FIG. 2, one sees that first and second opposed clamping arrangements 24A and 24B are respectively disposed to opposed longitudinal north and south sides of the nest 22 and third and fourth opposed clamping arrangements 24C and 24D are respectively disposed to opposed lateral east and west sides of the nest 22. A first pressing arrangement 26A is slidable along the north side of the nest 22 along a first rail arrangement 40A while second, third, and fourth pressing arrangements 26B, 26C, and 26D are respectively slidable along the south, east, and west sides of the nest 22 along second, third, and fourth rail arrangements 40B, 40C, and 40D. As is shown relative to the second pressing arrangement 26B, each pressing arrangement 26A, 26B, 26C, and 26D receives power through a power supply line 38, which can be electric, hydraulic, or any other effective type.

As is shown relative to the second clamping arrangement 24B, each clamping arrangement 24A, 24B, 24C, and 24D is reciprocatable proximally and distally relative to the nest 22 by operation of a clamp translation mechanism 42, which is shown relative to the second clamping arrangement 24B. The clamp translation mechanism 42 can comprise a clamp translation piston, which is also indicated at 42. As is also shown relative to the second clamping arrangement 24B, each clamping arrangement 24A, 24B, 24C, and 24D is capable of being opened and closed by operation of a clamp opening and closing mechanism 36, which can comprise a clamp opening and closing piston 36. Of course, plural other translation mechanisms 42 and opening and closing mechanisms 36 would readily occur to one skilled in the art after reading this disclosure. Each such mechanism is within the scope of the present invention.

While the elastomeric material application system 10 certainly could be fully automated, the present embodiment of the invention can be operated manually as is depicted in FIG. 3. By exploitation of the rectangular nature of the frame 12 and the catercorner orientation of the shoe 20 and nest 22 relative thereto, a manual operation of the elastomeric material application system 10 can be readily carried out by two persons 100A and 100B disposed to first and second sides of the frame 12. More particularly, a first person 100A can operate relative to, for example, the north and west sides of the nest 22 while the second person 100B can operate relative to, for example, the south and east sides of the nest 22. Under one embodiment, this can be carried out advantageously be a pivotable seat arrangement (not shown) for each person 100A and 100B such that each can pivot between a first position aligned with a first side of the nest 22 and a second position aligned with a second side of the nest 22.

By combined reference to FIGS. 4 through 7, one sees that each pressing arrangement 26 has what may be termed a beaver tooth 50. The beaver tooth 50 can be caused to reciprocate relative to the pressing arrangement 26 by any appropriate means including, for example, a trigger 52. The pressing arrangement 26 further includes a hook member 44 that rides along a first side of the rail 40 opposite to the beaver tooth 50 and a spring-loaded rider arrangement 55 that rides along a second side of the rail 40. The clamping arrangement 24 in this embodiment is disposed outboard of the pressing arrangement 26.

The shoe 20 retains a frame member 46 relative to which an elastomeric material, which is shown at 54 in FIGS. 8–12, can be applied by use of the elastomeric material application system 10. The frame member 46 can be any type of frame member 46 including, by way of example, a furniture frame member 46 relative to which one might seek to apply one or more panels of elastomeric material 54. In this example, the frame member 46 comprises a seat bottom 46 with an obverse side for providing support, a reverse side, and a peripheral edge. The frame member 46 has a groove 48 therein into which a locking spline 56 can be pressed by operation of the pressing arrangement 26 in general and the beaver tooth 50 in particular. When the locking spline 56 is pressed into the groove 46, the panel of elastomeric material 54 can be retained in place relative to the frame member 46 by a mutual frictional and mechanical engagement between the locking spline 56, the groove 46, and the panel of elastomeric material 54.

The shoe 20 and the nest 22 can be particularly sized and shaped to engage the frame member 46. As such, shoes 20 and nests 22 can be uniquely configured, modified, or adapted based on the frame member 46 to be engaged. The shoe 20 and the frame member 46 can be configured to have the peripheral edges of the frame member 46 project beyond the peripheral edges of the shoe 20 relative to the nest 22 such that the peripheral edges of the frame member 46 will tend to make first contact with the nest 22. The nest 22 can have an engaging surface sized, shaped, and contoured to engage the frame member 46 adjacent to the peripheral edges thereof.

Turning to the progressive views of FIGS. 8 through 12, one sees steps in an application of a panel of elastomeric material 54 relative to a frame member 46 according to the present invention. With the shoe 20 disposed in spaced relation relative to the nest 22, a frame member 46 can be engaged with the shoe 20 to be retained thereby. The frame member 46 is engaged with the shoe 20 with the obverse side of the frame member 46 facing the nest 22 and the reverse side of the frame member 46 facing the shoe 20. A panel of elastomeric material 54 can be disposed for being retained by the clamping arrangements 24. The panel of elastomeric material 54 can then be clamped by the clamping arrangements 24 overlying the nest 22.

Figure 9:
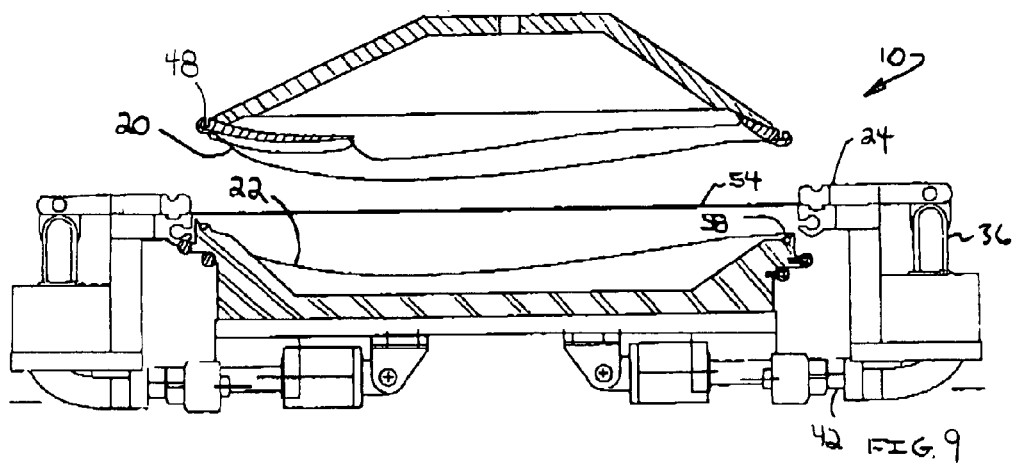
FIG. 9 is a view in front elevation of the elastomeric material application system of FIG. 8 in a second stage of material application.
Figure 10:
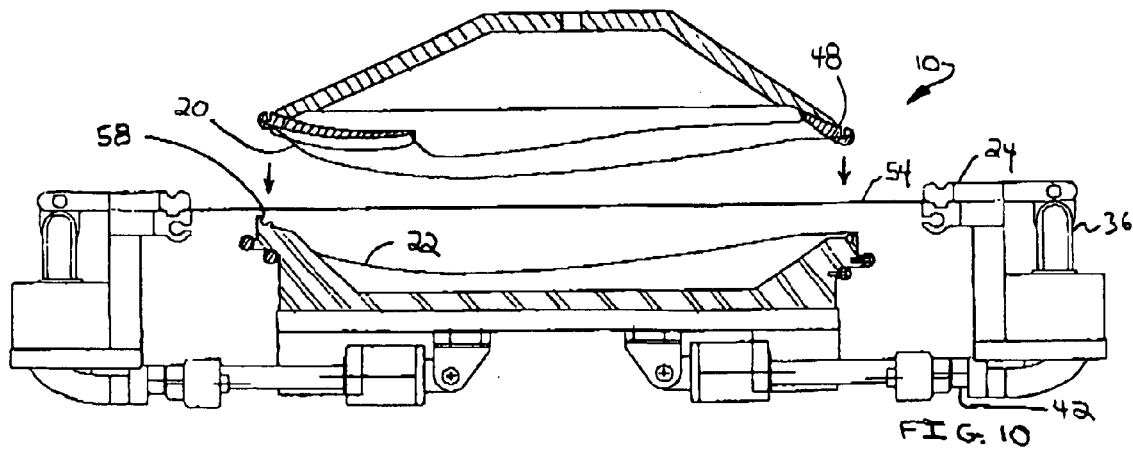
FIG. 10 is a view in front elevation of the elastomeric material application system of FIG. 8 in a third stage of material application.

The relative disposition of the clamping members 24 can be adjusted, such as by moving distally, to induce a selected initial tension in the panel of elastomeric material 54 by use of the clamp translation mechanisms 42 as is shown by the relative positioning of the clamping members 24 in FIGS. 9 and 10. The shoe 20 can then be lowered toward the engaging position of FIG. 11 thereby causing the frame member 46 to press into the panel of elastomeric material 54 to induce an initial deflection of the panel of elastomeric material 54 until the shoe 20 matingly engages the nest 22.

With the panel of elastomeric material 54 sandwiched between the peripheral edge of the frame member 46 and the engaging surface of the nest 22, the elastomeric material 54 can be maintained in its initial deflection condition by a frictional engagement between the shoe 20, the frame member 46, the elastomeric material 54, and the nest 22. An O-ring 58 of high friction material, such as rubber, disposed on the nest 22 can be incorporated to ensure a secure retention of the panel of elastomeric material 54 while the locking spline 56 is pressed into the groove 48 to permanently lock it in place.

The pressing arrangements 26 can ride along the rail 40 as they progressively press the locking spline 56 into the groove 48. The rail 40 can be curved to match the shape of the frame member 46. If necessary or desirable, the advance of the pressing arrangements 26 can be controlled by any appropriate mechanism, such as a step motor or the like, in combination with an endless drive arrangement, such as a toothed belt. A spring-loaded pulley can allow a change in overall belt length to accommodate changes in shoe 20, nest 22, and rail 40 shapes and structures. To prevent damage to the system and danger to the operators, a control means can also be provided to allow movement of the shoe 20 relative to the nest 22 only when all pressing arrangements 26 are disposed beyond the respective ends of the frame member 46 and, therefore, in a safe location. Furthermore, all operations of the system other than operation of the pressing arrangements 26, including the movement of the shoe 20, can be prevented when the pressing arrangements 26 are in operation.

Figure 19:
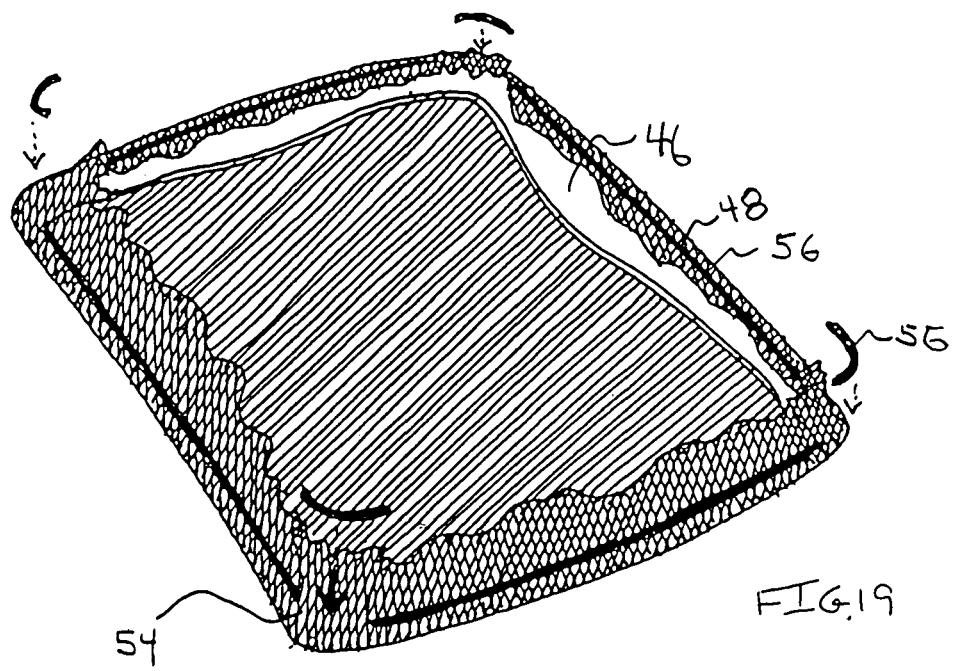
FIG. 19 is a perspective view of a frame member with segmented locking splines in a first stage of manufacture.
Figure 20:
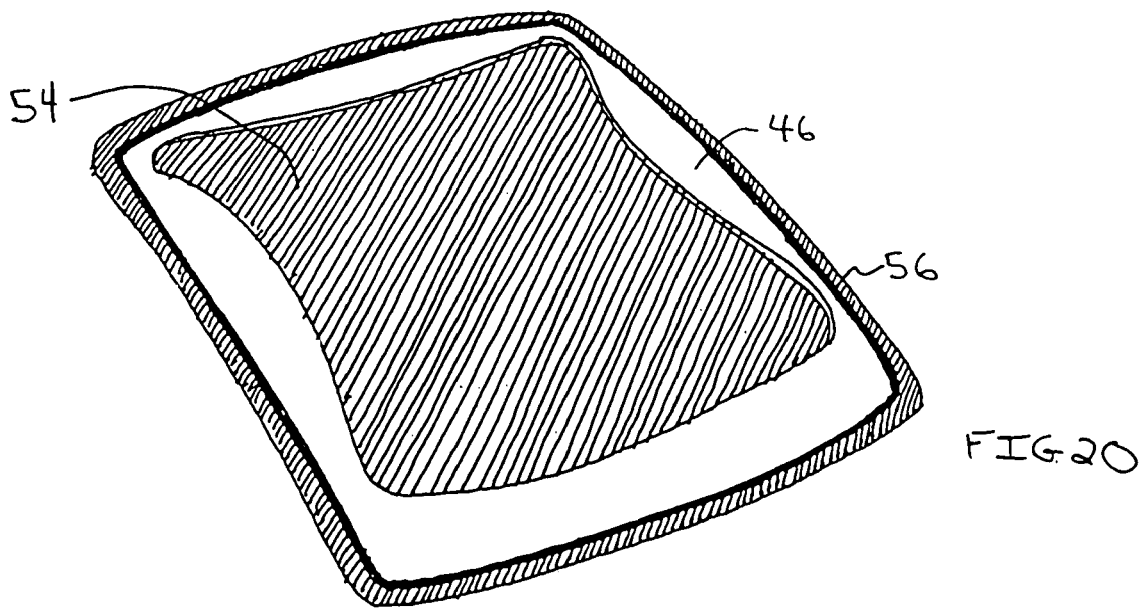
FIG. 20 is a perspective view of the frame member of FIG. 19 in a second stage of manufacture.

As FIG. 19 shows, the locking spline 56 can be subdivided into multiple segments to accommodate the sides of the frame member 46. For example, four segments of the locking spline 56 can be employed to secure the elastomeric material 54 relative to each of the four sides of the frame member 46. Corner sections of the locking spline 56 can then be pressed into place to secure the corner portions of the elastomeric material 54 if the same has not already been achieved. If necessary or desirable, excess portions of the panel of elastomeric material 54 can be trimmed by any appropriate means, the result of which being shown in FIG. 20.

Figure 14:
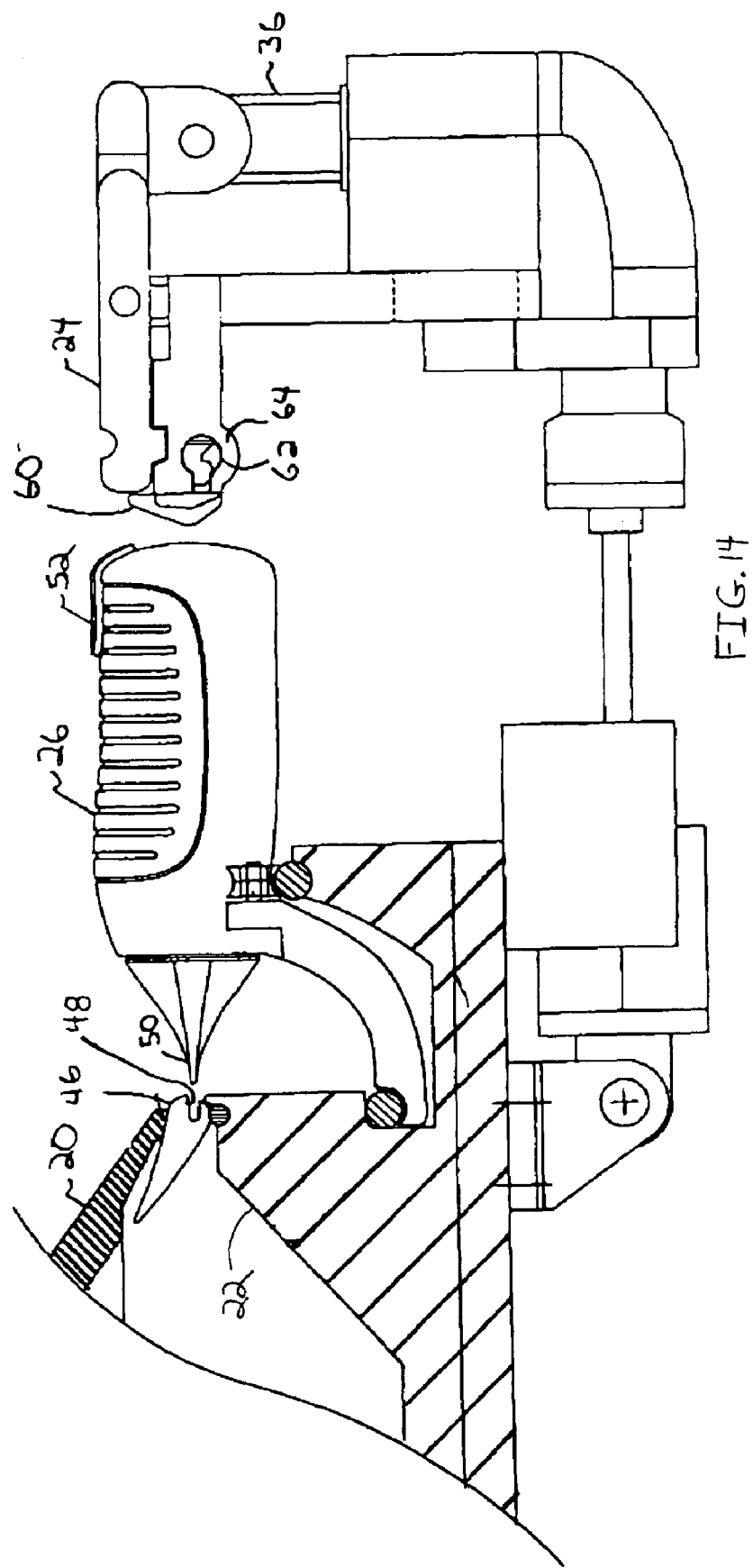
FIG. 14 is a view in front elevation of an elastomeric material application system according to the present invention configured for pressing a locking spline into a lateral groove.

As FIG. 14 makes clear, the orientation of the pressing arrangements 26 and any other components of the invention can be readily adjusted to accommodate a frame member 46 that has a lateral groove 48. With that, a panel of elastomeric material 54 can be retained relative to the frame member 46 spanning from edge to edge of the frame member 46. Furthermore, differently shaped and styled shoes 20, nests 22, and rails 40 can be readily applied. It will be clear, therefore, that the elastomeric material application system 10 provides a universal applicable machine that can be employed relative to substantially any application of elastomeric material.

Figure 15:
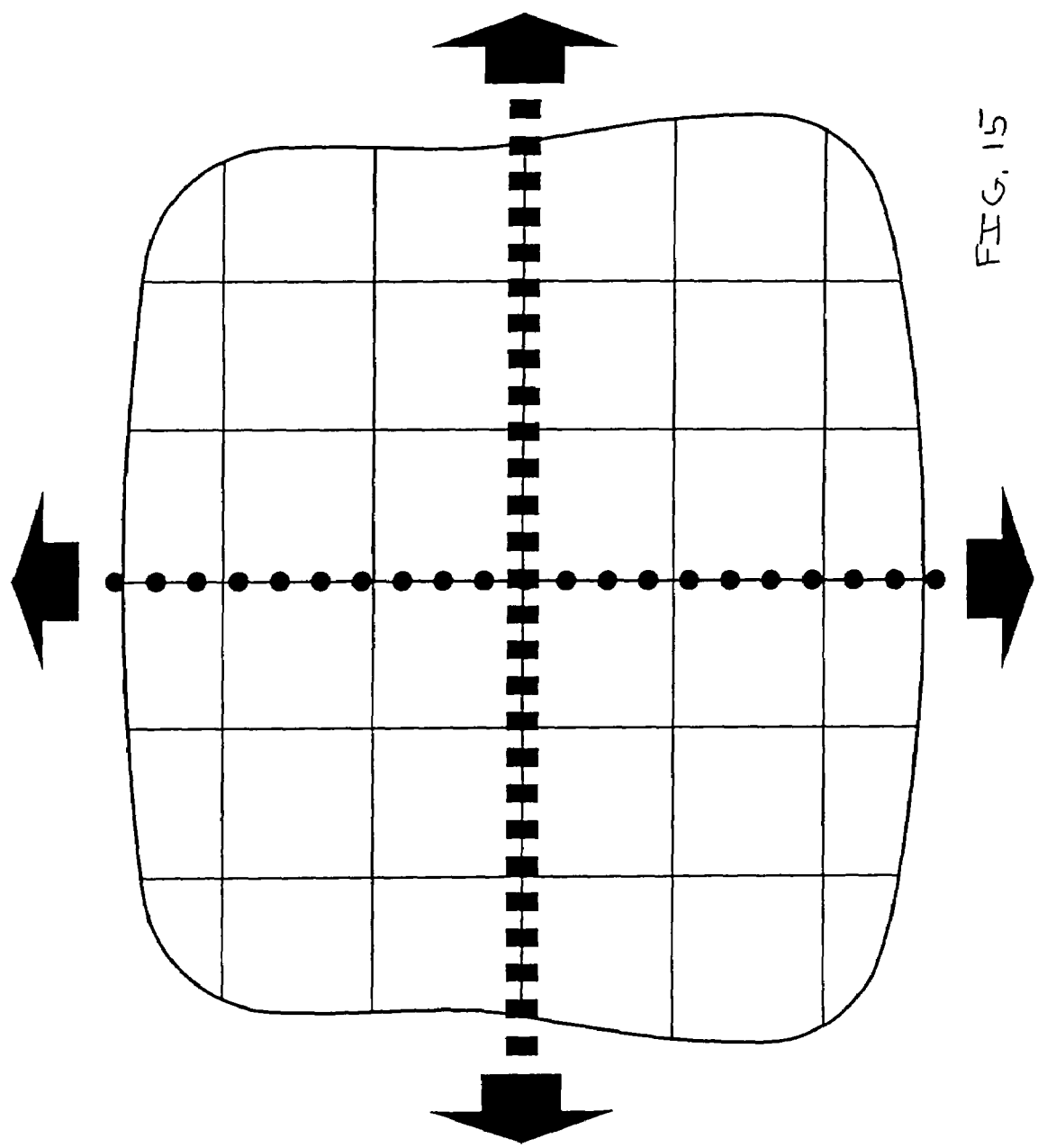
FIG. 15 is a graphical depiction of unaltered initial tensioning of a panel of elastomeric material.
Figure 16:
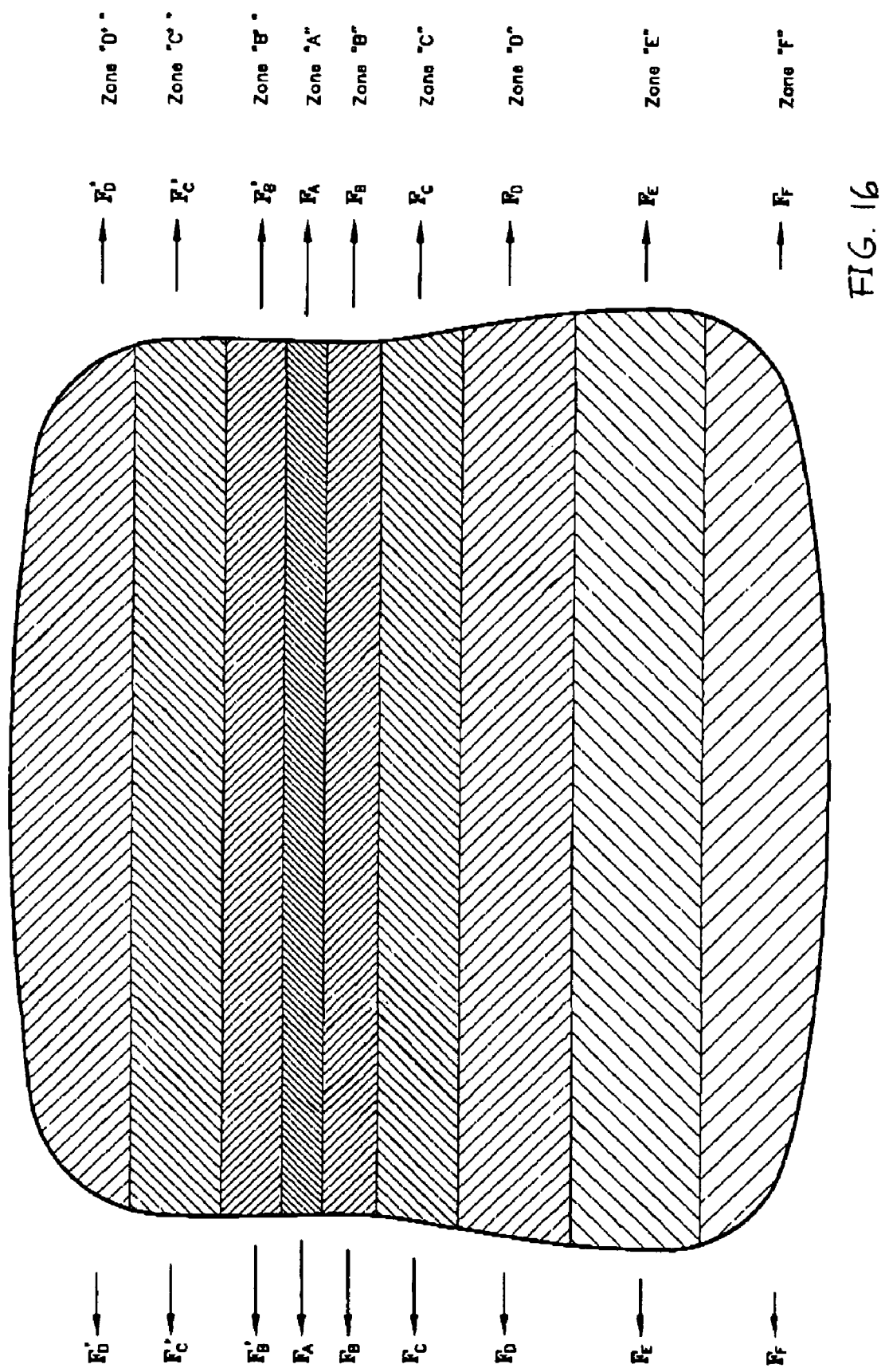
FIG. 16 is a graphical depiction of lateral east and west support zones of a panel of elastomeric material.
Figure 17:
FIG. 17 is a graphical depiction of longitudinal north and south support zones of a panel of elastomeric material.

As noted previously, the panel of elastomeric material 54 is subjected to an initial deflection and, therefore, a pretensioning prior to and while the shoe 20 and the nest 22 are engaged with one another. A symmetrical pretensioning is depicted graphically in FIG. 15. The astute observer will appreciate, however, that certain applications may be best served by applying differing tensions to differing portions of the panel of elastomeric materials 54 to enhance the ergonomics and general performance of the resulting structure. For example, one may wish to have greater tension and, therefore, support in a central portion of a seat frame member 46 to provide optimal support to a user as compared to more distal portions of the seat member where less support is normally required. FIGS. 16 and 17 show possible support zones along lateral east and west and longitudinal north and south directions respectively. In the lateral direction, Zone "A" can provide the greatest support while progressively less support can be provided in Zones "B", "C", "D", "E", and "F". In the longitudinal direction, the greatest support can be provided in Zone "I" and progressively less support can be provided in Zones "II", "III", and "IIII". Of course, the arrangement and relative positioning of the various Zones can vary nearly infinitely.

Figure 18:
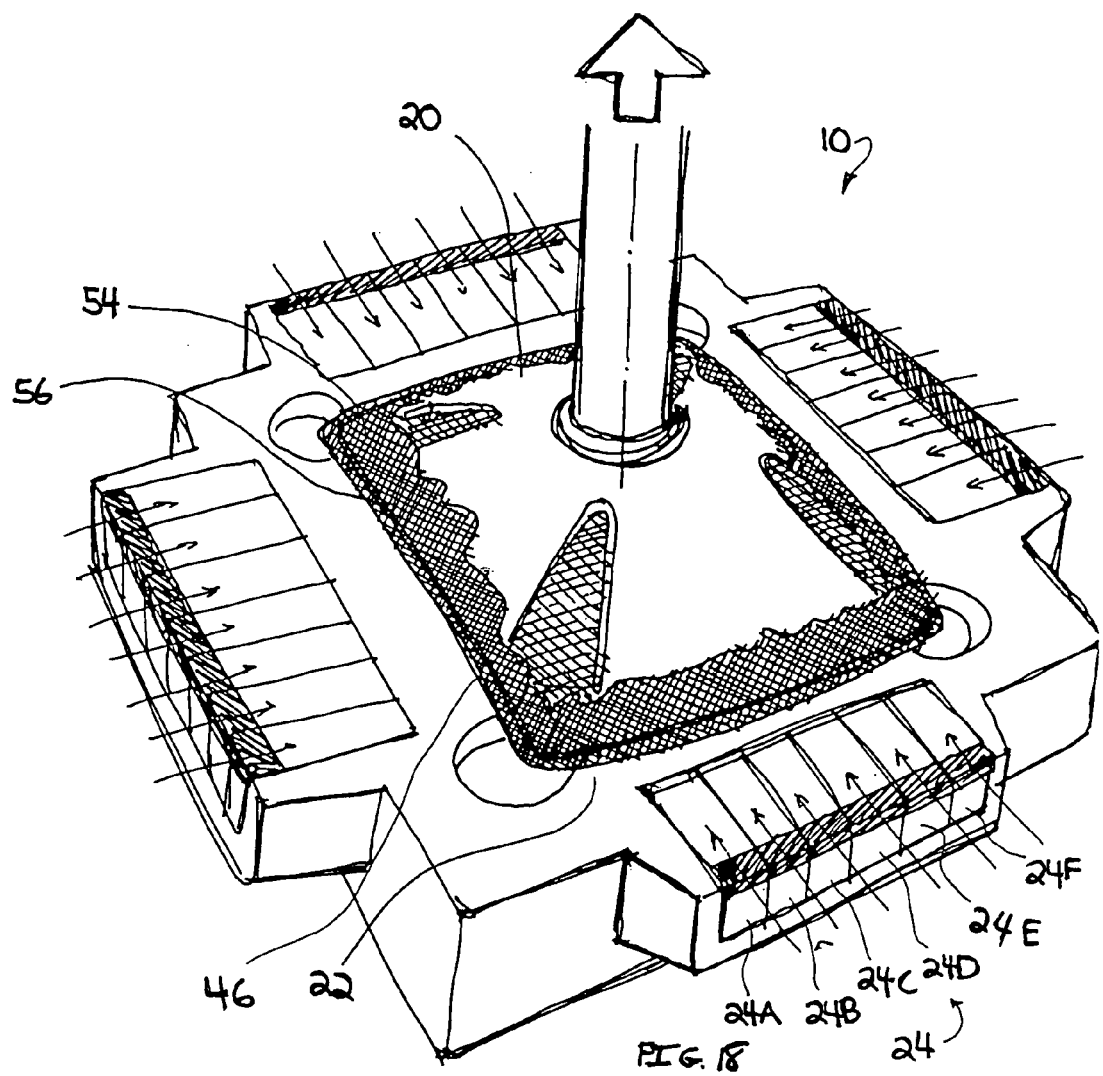
FIG. 18 is a perspective view of a segmented clamping arrangement pursuant to the present invention.

Advantageously, the present invention provides a number of mechanisms for achieving such a controlled and varied initial and final tensioning in the panel of elastomeric material 54. For example, a controlled and varied tensioning in the panel of elastomeric material 54 can be achieved by clamping arrangements 24 that are segmented into plural individually operable clamping arrangements, such as those indicated at 24A, 24B, 24C, 24D, 24E, and 24F in FIG. 18. Under such a construction, the panel of elastomeric material 54 can be initially retained by the clamping arrangement 24 and then the individually operable clamping arrangements 24A, 24B, 24C, 24D, 24E, and 24F can be moved proximally or distally relative to the frame member 46 to produce a variable tension pattern in the panel of elastomeric material 54.

Figure 7:
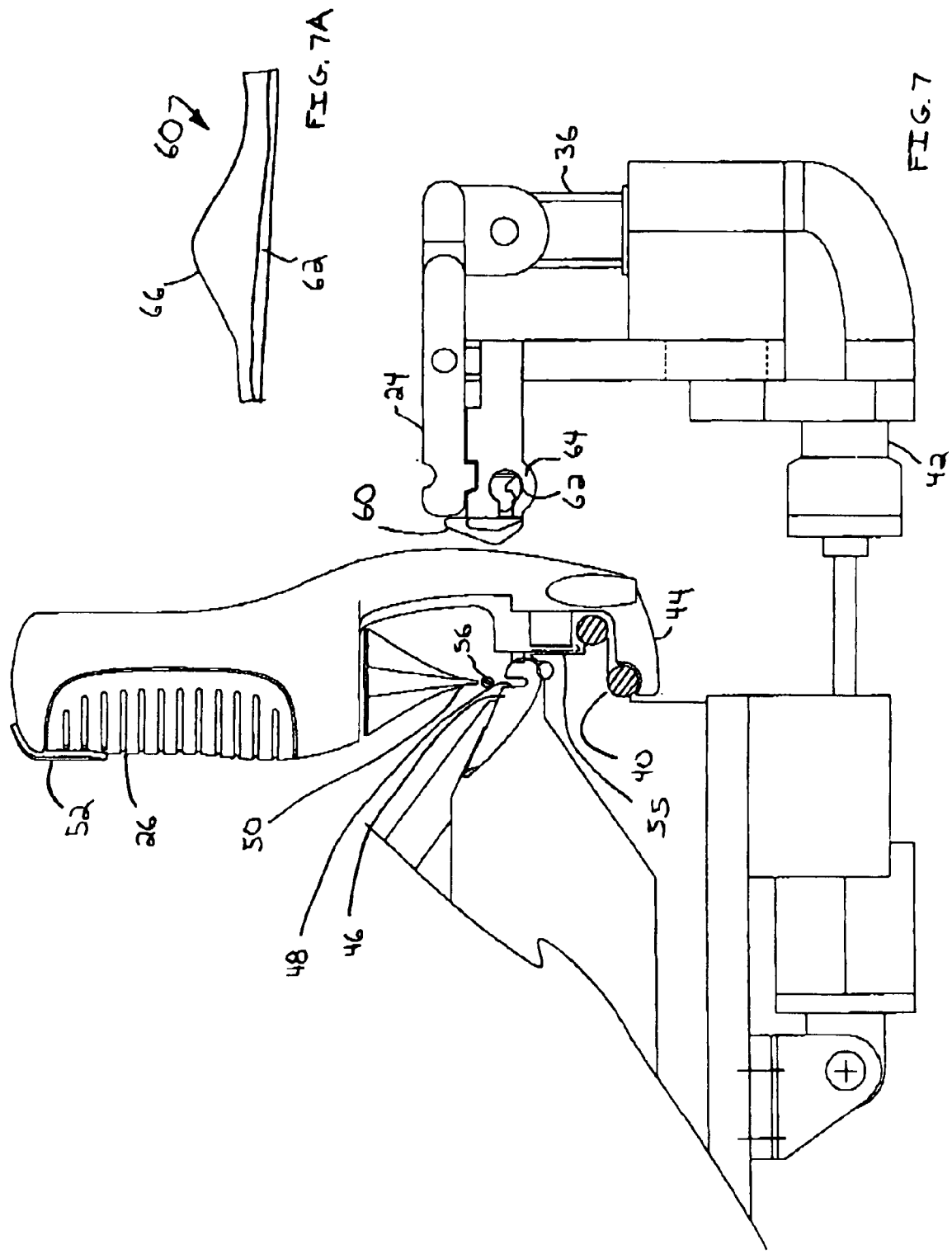
FIG. 7 is a further view in front elevation of pressing and clamping arrangements pursuant to the present invention.
Figure 8:
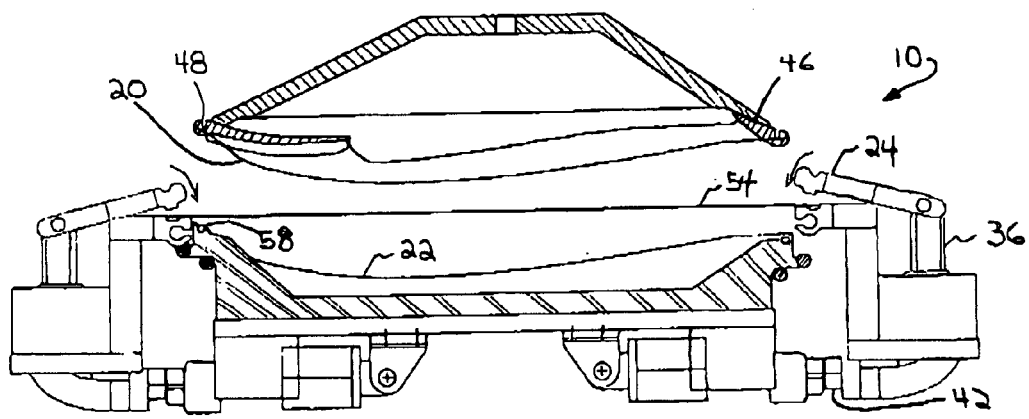
FIG. 8 is a view in front elevation of an elastomeric material application system in a first stage of material application.

An alternative means for altering the initial tensions in the panel of elastomeric material 54 to produce a variable tension pattern in the panel of elastomeric material 54 can be achieved by use of what can be termed a deflection control member, which is indicated at 60 in FIGS. 7 and 7A. The deflection control member 60 can be interposed between the clamping portion of one or more of the clamping arrangements 24 and the shoe 20 and nest 22 combination. In the embodiment of FIG. 7, the deflection control member 60 is retained relative to the clamping member 24 by having a rod member 62 disposed within a mouth 64 of the clamping arrangements 24. As FIG. 7A shows, the deflection control member 60 can have an edge portion 66 that varies in height thereby to cause a varied initial deflection and, therefore, tension in the panel of elastomeric material 54. Advantageously, the shape of the edge portion 66 can be varied to cause the final tensions in the panel of elastomeric material 54 to match the desired tensions of the particular application and, possibly, the particular user of the resulting product.

With certain details and embodiments of the present invention for an elastomeric material application system disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims express certain elements as means for performing a specific function, at times without the recital of structure or material. As the law demands, these claims shall be construed to cover not only the corresponding structure and material expressly described in this specification but also all equivalents thereof.

I claim as deserving the protection of Letters Patent:

1. A material application system for applying a panel of material to a framework, the material application system comprising:
   a shoe for retaining the framework to which the panel of material is to be applied;
   a means for retaining the framework relative to the shoe;
   a nest;
   a means for retaining the panel of material traversing between the shoe and the nest;
   a means for selectively moving the shoe and the nest into and out of an engaged position wherein the panel of material is sandwiched between the shoe and the nest and a disengaged position; and
   a means for inducing an attachment of the panel of material to the framework.

2. The material application system of claim 1 wherein the means for retaining the panel of material between the shoe and the nest comprises opposed mechanisms for retaining opposite portions of the panel of material.

3. The material application system of claim 2 further comprising means for selectively moving at least one of the opposed mechanisms proximally and distally relative to the other whereby a pretensioning of the panel of material can be induced.

4. The material application system of claim 3 further comprising a means for inducing a varied pretensioning of the panel of material.

5. The material application system of claim 4 wherein the means for inducing a varied pretensioning of the panel of material comprises a segmenting of at least one of the opposed mechanisms for retaining opposite portions of the panel of material.

6. The material application system of claim 5 wherein the opposed mechanisms comprise clamping arrangements and wherein at least one of the clamping arrangements is segmented into multiple, individually moveable clamping arrangements.

7. The material application system of claim 4 wherein the means for inducing a varied pretensioning of the panel of material comprises a deflection control member and a means for retaining the deflection control member with at least a portion thereof interposed between the opposed mechanisms for retaining opposite portions of the panel of material and the shoe and the nest.

8. The material application system of claim 7 wherein the deflection control member has a surface that varies in effective height to yield a varied pretensioning in the panel of material.

9. The material application system of claim 1 wherein the framework has a groove therein and further comprising a locking spline for being received into the groove in the framework and wherein the means for inducing an attachment of the panel of material to the framework comprises a means for pressing the locking spline into the groove.

10. The material application system of claim 9 wherein the means for pressing the locking spline into the groove comprises a pressing arrangement with a tooth member and a means for reciprocatably driving the tooth member.

11. The material application system of claim 10 wherein the pressing arrangement further comprises a means for enabling the tooth member to travel along an edge of the framework to enable a progressive pressing of the locking spline into the groove.

12. The material application system of claim 11 wherein the means for enabling the tooth member to travel along the edge of the framework comprises a rail.

13. The material application system of claim 12 wherein the pressing arrangement further comprises a means for retaining the tooth member relative to the rail to facilitate an application of force by the tooth member on the locking spline.

14. The material application system of claim 13 wherein the rail is contoured to correspond to a contour of the framework.

15. The material application system of claim 9 wherein the framework and the shoe have peripheral edges wherein the peripheral edges of the framework project beyond the peripheral edges of the shoe relative to the nest whereby the peripheral edges of the framework will tend to make first contact with the nest when the shoe and the nest are in an engaged position.

16. The material application system of claim 15 wherein the nest has an engaging surface sized, shaped, and contoured to correspond to the size, shape, and contour of a peripheral surface of the framework.

17. The material application system of claim 16 further comprising an O-ring disposed along the engaging surface of the nest.

18. A material application system for applying a panel of material to a framework, the material application system comprising:
   a shoe for retaining the framework to which the panel of material is to be applied;
   a means for retaining the framework relative to the shoe;
   a nest;
   opposed mechanisms for retaining opposite portions of the panel of material with a body portion of the panel of material traversing between the shoe and the nest;
   a means for selectively moving the shoe and the nest into and out of an engaged position wherein the panel of material is sandwiched between the shoe and the nest and a disengaged position;
   means for selectively moving at least one of the opposed mechanisms proximally and distally relative to the other whereby a pretensioning of the panel of material can be induced; and
   a means for inducing an attachment of the panel of material to the framework.

19. The material application system of claim 18 further comprising a means for inducing a varied pretensioning of the panel of material.

20. The material application system of claim 19 wherein the means for inducing a varied pretensioning of the panel of material comprises a segmenting of at least one of the opposed mechanisms for retaining opposite portions of the panel of material.

21. The material application system of claim 20 wherein the opposed mechanisms comprise clamping arrangements and wherein at least one of the clamping arrangements is segmented into multiple, individually moveable clamping arrangements.

22. The material application system of claim 19 wherein the means for inducing a varied pretensioning of the panel of material comprises a deflection control member and a means for retaining at least a portion of the deflection control member interposed between the opposed mechanisms for retaining opposite portions of the panel of material and the shoe and the nest.

23. The material application system of claim 22 wherein the deflection control member has a surface that varies in effective height to yield a varied pretensioning in the panel of material.

24. The material application system of claim 18 wherein the framework has a groove therein and further comprising a locking spline for being received into the groove in the framework and wherein the means for inducing an attachment of the panel of material to the framework comprises a means for pressing the locking spline into the groove.

25. The material application system of claim 24 wherein the means for pressing the locking spline into the groove comprises a pressing arrangement with a tooth member and a means for reciprocatably driving the tooth member.

26. The material application system of claim 25 wherein the pressing arrangement further comprises a means for enabling the tooth member to travel along an edge of the framework to enable a progressive pressing of the locking spline into the groove.

27. The material application system of claim 26 wherein the means for enabling the tooth member to travel along the edge of the framework comprises a rail.

28. The material application system of claim 27 wherein the pressing arrangement further comprises a means for retaining the tooth member relative to the rail to facilitate an application of force by the tooth member on the locking spline.

29. The material application system of claim 28 wherein the rail is contoured to correspond to a contour of the framework.

30. The material application system of claim 24 wherein the framework and the shoe have peripheral edges wherein the peripheral edges of the framework project beyond the peripheral edges of the shoe relative to the nest whereby the peripheral edges of the framework will tend to make first contact with the nest.

31. The material application system of claim 30 wherein the nest has an engaging surface sized, shaped, and contoured to correspond to the size, shape, and contour of a peripheral surface of the framework.

32. The material application system of claim 31 further comprising an O-ring disposed along the engaging surface of the nest.

* * * * *